Sept. 11, 1951  A. J. BRUNNER  2,567,693

HIGH-PRESSURE NOZZLE

Filed Oct. 14, 1948

INVENTOR
A. J. BRUNNER
BY
ATTORNEY

Patented Sept. 11, 1951

2,567,693

UNITED STATES PATENT OFFICE 2,567,693

HIGH-PRESSURE NOZZLE

Anton J. Brunner, Congress Park, Ill., assignor to Western Electric Company, Incorporated, New York, N. Y., a corporation of New York Application October 14, 1948, Serial No. 54,518

3 Claims. (Cl. 18—30)

This invention relates to high pressure nozzles and in particular to injection molding machine nozzles.

In molding machinery currently used in the thermoplastic molding art the injection nozzle at the exit end of the injection heating cylinder is provided with a relatively long shank which extends well within the end portion of the heating cylinder in order to withstand the high pressures developed in this type of work. The nozzle shank is usually provided with external threads which engage internal threads in the end portion of the heating cylinder. The pressure on the nozzle is tremendously increased when a foreign body, such as a piece of metal accidentally mixed with the plastic compound, is jammed within the nozzle opening. As a result the internal threads at the end of the cylinder may be deformed to such an extent that when the nozzle is removed for replacement, regrinding and rethreading of the internal walls of the exit aperture in the chamber are required.

It is an object of this invention to provide a new and efficient injection nozzle and associated apparatus for injection molding machines, in particular a nozzle that will be subject to relatively lower overall pressure than those currently in use.

In accordance with one embodiment of this invention an injection molding heating cylinder is provided at its exit end with a relatively short conical nozzle securely clamped to the end of the cylinder by a retaining collar with a central aperture having tapering conforming surfaces which engage the conical outer surface of the nozzle to accurately center and clamp the nozzle to the end of the heating cylinder in such manner that the exit opening of the cylinder is aligned with the nozzle aperture, the retaining collar being threadedly fastened to the end of the cylinder.

A complete understanding of this invention will be had by referring to the following detailed description taken in conjunction with the accompanying drawing in which Fig. 1 is a front elevational view of one embodiment of the invention;

Figure 1:
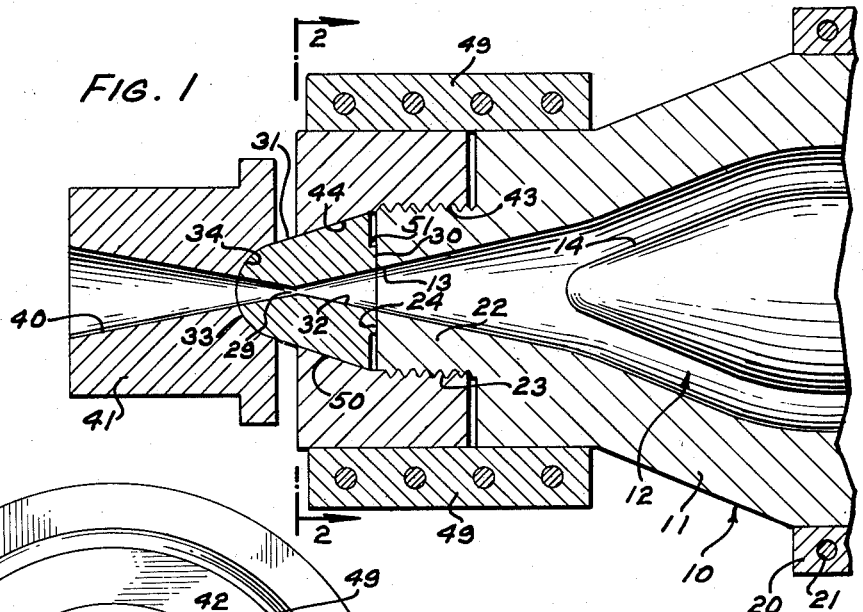

The apparatus illustrated in the drawing includes a heating cylinder 10 (partially shown) for a thermoplastic molding machine in which cylinder, molding compound in transit at high pressure is heated to plasticize it. The cylinder 10 comprises a substantially annular wall 11 and a tapered chamber 12 terminating in an exit 13 at the tapered end. For convenience, this end of the heating cylinder will hereinafter be referred to as the exit end. A spreader or torpedo 14 is arranged within the chamber to force the molding compound into a thin enough section to permit it to be thoroughly heated through the wall 11, which may be surrounded by a heating jacket 20 of any suitable type, for example, one containing electrical heating elements 21.

The exit end of the cylinder 10 has a reduced portion 22 with an exterior thread 23, and an annular seating surface 24 which encircles the exit 13 and is adapted to engage a circular base surface 30 of a conical-shaped nozzle 31 having an aperture 32 coaxial with the conical axis. The aperture 32 tapers from both ends toward a relatively narrow passage 29 within the nozzle 31, the base end of the aperture 32, when joined with the exit 13, forming a continuation of the tapered end of the chamber 12. A rounded nose 33 on the nozzle permits the end of the nozzle to nest in a cup-shaped inlet end 34 of a sprue chamber 40 formed in a bushing insert 41 and leading to a die cavity (not shown).

In the embodiment shown in Fig. 1 the nozzle 31 is clamped to the exit end of the heating cylinder 10 by a retaining collar 42 having a central aperture threaded at one end 43 and tapered at the other end 44 to provide a conforming surface for engagement with the outer conical surface 50 of the nozzle 31. The tapered surface 44 cooperating with the conical surface 50 furnishes ideal clamping action when the collar 42 is screwed on the threaded portion of the exit end of the cylinder. This clamping arrangement results in a securely fixed nozzle with a leak-proof seal where the base surface 30 abuts the seating surface 24. It will be noticed that the base surface 30 is relatively small in area due to an annular shoulder 51 formed in the base of the cone, thus resulting in a higher unit force to effect a better seal.

A suitable heating jacket 49 around the exit end of the cylinder aids in maintaining the required plasticity of the molding compound at and near the nozzle.

Figure 2:
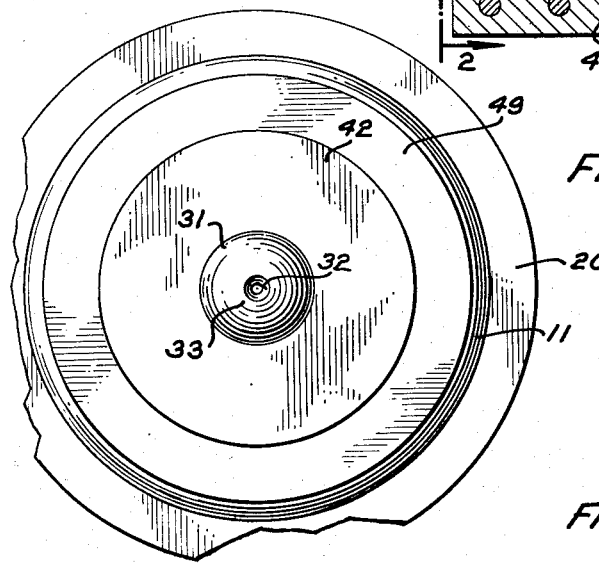
Fig. 2 is a section taken on the lines 2—2 of Fig. 1.
Figure 3:
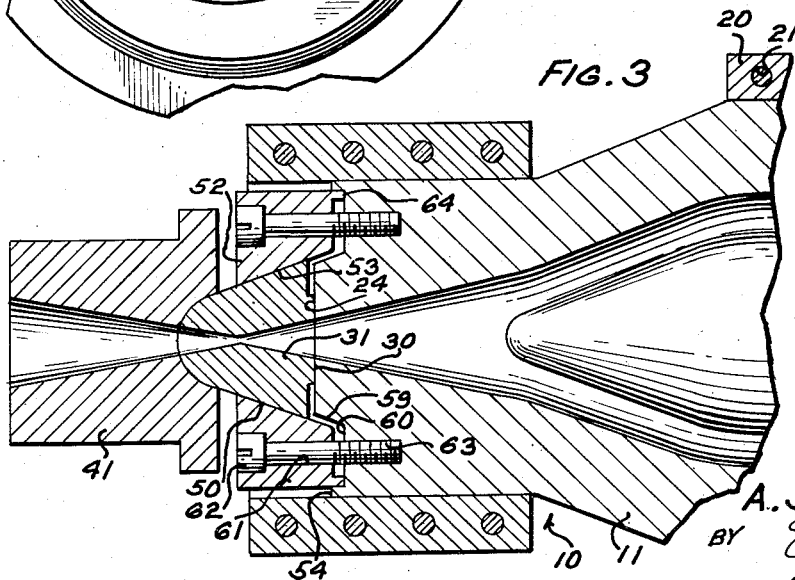
Fig. 3 is a section view of a second embodiment of the invention illustrating an alternative method of securing the retaining collar to the exit end of the heating cylinder.

Another embodiment of the invention is illustrated in Fig. 2 in which the nozzle is clamped to the exit end of the heating cylinder by a retaining ring 52 bolted to the exit end of the heating cylinder 10. The retaining ring has a central aperture 53 with a conforming surface tapered to fit and enter into clamping engagement with the outer conical surface 50 of the nozzle 31. The ring is fitted and guided into position by an annular lip 54 around the exit end of the heating cylinder, which lip defines one side of a groove 60 formed in the end portion of the heating cylinder, the other boundary of the groove being a tapered coaxial reduced portion 59 at the exit end of the cylinder. At its outer end the reduced portion 59 has formed thereon a seating surface 24 which abuts the annular base surface 30 of the nozzle 31 when the nozzle is clamped in position. A plurality of bolt holes 61 are disposed radially around the retaining ring to receive bolts 62 which are screwed into threaded holes 63 formed in the end portion of the heating cylinder. That side of the retaining ring 52 which is adjacent the surface of the groove 60 is provided with an annular pressure pad 64 formed integral with the ring 52 to furnish a fulcrum for the clamping pressure exerted by the bolts and the ring.

The clamping arrangements in the embodiments illustrated herein permit the use of a short nozzle and act as a centering means for aligning the nozzle with the exit opening of the heating chamber and the sprue inlet leading to the die cavity. A short nozzle has less aperture area subject to the injection pressure and to the abnormal pressures due to solid foreign objects which may plug the nozzle aperture at its restricted point.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a molding machine the combination comprising a cylinder having tapering interior passage terminating in an exit at one end of said cylinder, a seating surface on the exit end of said cylinder and encircling said exit, a conical nozzle having a tapered passage coaxially therethrough, said passage tapering from the base toward the tip of said nozzle and forming a smooth continuation of said interior tapering passage, a retaining ring with a tapered aperture therethrough for engaging the conical outer surface of said nozzle, radially spaced bolts for securing said ring to the exit end of said cylinder thereby to align said nozzle passage and said exit, an annular pressure pad on said ring radially exterior of said bolts and abutting a surface on the exit end of said cylinder, thereby forming a fulcrum for the clamping pressure exerted by the bolts and ring.

2. In a plastic molding apparatus the combination comprising a member with a reduced end portion, said member having a hollow interior with an interior wall surface tapering to an exit opening and defining an injection heating chamber, a seating surface on said reduced end and encircling said exit opening, a nozzle having a conical outer surface and a tapered aperture coaxial with the conical axis, said tapered aperture forming a smooth continuation of said tapering interior wall surface, an annular shoulder of reduced surface area on the base of said nozzle surrounding the base end of said aperture and adapted to intimately engage said seating surface and form a seal thereby, a retaining collar for clamping said nozzle to said reduced end, said collar having a tapered aperture with an interior conforming surface for engaging the conical outer surface of the nozzle, radially spaced bolts for fastening said collar to said reduced end, and an annular pressure pad on said ring radially exterior of said bolts and abutting a surface on the exit end of said member, thereby forming a fulcrum for the clamping pressure exerted by the bolts and ring.

3. A molding apparatus, which comprises an injection cylinder having an exit passage and a socket at the exit of the passage, a frustoconical nozzle having a passage coaxially extending therethrough tapering from the base toward the tip of said nozzle to form a smooth continuation of said tapered passage, a retaining ring designed to fit into the socket in the cylinder and provided with a tapered opening therein for engaging conical outer surface of the nozzle, the retaining ring being provided with an outer annular skirt for engaging the bottom of the socket in a position holding the nozzle against the end of the cylinder, and a plurality of bolts for securing the ring to the exit end of the cylinder to align the nozzle passage with the passage in the cylinder, said retaining ring being provided with bores for the bolts positioned radially inside said annular skirt so that the skirt acts as a fulcrum in forcing the nozzle against the cylinder, said cylinder being provided with tapped bores spaced so as to receive the bolts.

ANTON J. BRUNNER.

REFERENCES CITED

The following references are of record in the file of this patent:

UNITED STATES PATENTS

| Number | Name | Date |
|---|---|---|
| 1,084,914 | Wellman | Jan. 20, 1914 |
| 1,194,549 | Schnitzler | Aug. 15, 1916 |
| 2,115,590 | Ryder | Apr. 26, 1938 |
| 2,237,790 | Rogers | Apr. 8, 1941 |
| 2,308,867 | Dinzl | Jan. 19, 1943 |
| 2,309,943 | Ernst | Feb. 2, 1943 |
| 2,322,200 | Tucker | June 15, 1943 |
| 2,461,856 | Tornberg | Feb. 15, 1949 |